(12) United States Patent
Wijmans et al.

(10) Patent No.: US 8,034,168 B2
(45) Date of Patent: Oct. 11, 2011

(54) COMBUSTION SYSTEMS AND POWER PLANTS INCORPORATING PARALLEL CARBON DIOXIDE CAPTURE AND SWEEP-BASED MEMBRANE SEPARATION UNITS TO REMOVE CARBON DIOXIDE FROM COMBUSTION GASES

(75) Inventors: Johannes G. Wijmans, Menlo Park, CA (US); Timothy C Merkel, Menlo Park, CA (US); Richard W. Baker, Palo Alto, CA (US)

(73) Assignee: Membrane Technology & Research, Inc, Menlo Park, CA (US)

( * ) Notice: Subject to any disclaimer, the term of this patent is extended or adjusted under 35 U.S.C. 154(b) by 0 days.

(21) Appl. No.: 13/092,489

(22) Filed: Apr. 22, 2011

(65) Prior Publication Data
US 2011/0200491 A1 Aug. 18, 2011

Related U.S. Application Data

(63) Continuation-in-part of application No. 12/807,846, filed on Sep. 13, 2010.

(51) Int. Cl.
*B01D 53/22* (2006.01)
(52) U.S. Cl. ............. 96/4; 96/7; 96/134; 95/51; 95/139; 95/236; 62/606; 62/624; 60/274; 60/278
(58) Field of Classification Search .............. 96/4, 7, 96/9, 134; 95/45, 46, 51, 130, 138, 139, 95/236; 62/600, 606, 624; 60/273, 274, 60/278
See application file for complete search history.

(56) References Cited

U.S. PATENT DOCUMENTS

| | | | |
|---|---|---|---|
| 4,350,511 A | 9/1982 | Holmes et al. | |
| 4,371,381 A | 2/1983 | Schuftan | |
| 4,462,814 A | 7/1984 | Holmes et al. | |
| 4,639,257 A * | 1/1987 | Duckett et al. ................. | 62/624 |
| 4,781,907 A * | 11/1988 | McNeill ........................... | 95/51 |
| 4,923,493 A | 5/1990 | Valencia et al. | |
| 4,931,070 A | 6/1990 | Prasad | |
| 4,963,165 A | 10/1990 | Blume et al. | |
| 4,990,168 A | 2/1991 | Sauer et al. | |
| 5,034,126 A | 7/1991 | Reddy et al. | |
| 5,233,837 A | 8/1993 | Callahan | |
| 5,240,471 A | 8/1993 | Barbe et al. | |
| 5,500,036 A | 3/1996 | Kalthod | |

(Continued)

OTHER PUBLICATIONS

A Kohl, R. Nielsen, Gas Purification, 5th ed., Gulf Publishing, Houston, TX, 1997 pp. 1188-1237.

*Primary Examiner* — Jason M Greene
(74) *Attorney, Agent, or Firm* — K. Bean; J. Farrant

(57) ABSTRACT

Disclosed herein are combustion systems and power plants that incorporate sweep-based membrane separation units to remove carbon dioxide from combustion gases. In its most basic embodiment, the invention is a combustion system that includes three discrete units: a combustion unit, a carbon dioxide capture unit, and a sweep-based membrane separation unit. In a preferred embodiment, the invention is a power plant including a combustion unit, a power generation system, a carbon dioxide capture unit, and a sweep-based membrane separation unit. In both of these embodiments, the carbon dioxide capture unit and the sweep-based membrane separation unit are configured to be operated in parallel, by which we mean that each unit is adapted to receive exhaust gases from the combustion unit without such gases first passing through the other unit.

17 Claims, 4 Drawing Sheets

U.S. PATENT DOCUMENTS

| | | |
|---|---|---|
| 5,641,337 A | 6/1997 | Arrowsmith et al. |
| 5,681,433 A | 10/1997 | Friesen et al. |
| 5,843,209 A | 12/1998 | Ray et al. |
| 6,085,549 A | 7/2000 | Daus et al. |
| 6,478,852 B1 | 11/2002 | Callaghan |
| 6,648,944 B1 | 11/2003 | Baker et al. |
| 7,625,427 B2 * | 12/2009 | Clarke et al. .............. 95/51 |
| 2008/0176174 A1 * | 7/2008 | White et al. .............. 431/5 |
| 2010/0236404 A1 | 9/2010 | Baker et al. |
| 2011/0005272 A1 | 1/2011 | Wijmans et al. |

* cited by examiner (not in accordance with invention)

US 8,034,168 B2

COMBUSTION SYSTEMS AND POWER PLANTS INCORPORATING PARALLEL CARBON DIOXIDE CAPTURE AND SWEEP-BASED MEMBRANE SEPARATION UNITS TO REMOVE CARBON DIOXIDE FROM COMBUSTION GASES

This application claims the benefit of U.S. Provisional Application Ser. No. 61/127,415, filed May 12, 2008, PCT Application No. PCT/US09/02874, filed May 8, 2009; U.S. application Ser. No. 12/734,941, filed Jun. 2, 2010; and U.S. application Ser. No. 12/807,846, filed Sep. 13, 2010, the disclosures of which are hereby incorporated herein by reference in their entireties.

This invention was made in part with U.S. Government support under SBIR Award No. DE-NT-000-5312, awarded by the U.S. Department of Energy. The U.S. Government has certain rights in this invention.

FIELD OF THE INVENTION

The invention relates to combustion systems and power plants that incorporate sweep-based membrane separation units to remove carbon dioxide from combustion gases.

BACKGROUND OF THE INVENTION

In a traditional power generation process, a fuel (such as coal, natural gas, or syngas) is combusted in the presence of oxygen, producing a stream of hot, high-pressure gas. This hot, high-pressure gas is then used to drive a gas turbine, which in turn drives a generator, producing electrical energy. The exhaust gas from the turbine is still very hot and may contain as much as 50% of the energy generated by the combustion process. This remaining heat (i.e., hot exhaust fumes) is wasted.

In recent years, there has been considerable interest in combined cycle power generation to improve the energy efficiency of the process. A combined cycle power plant generates additional electricity by using the hot exhaust gas from the gas turbine to boil water to make steam. The steam, in turn, is used to drive a secondary steam turbine, generating additional electricity. Combined cycle power generation processes are well-known in the art and are described, for example, by Rolf Kehlhofer et al. in *Combined-Cycle Gas & Steam Power Plants* ($3^{rd}$ ed., PennWell Corporation; Tulsa, Okla., 2009).

Although the combined cycle power generation process is inherently more expensive than the more traditional, gas turbine-only power generation process due to the additional capital equipment required, it is expected that the additional energy generated will eventually more than off-set the cost of the additional equipment. As a result, most new gas power plants in North America and Europe are combined cycle.

However, regardless of whether a traditional or a combined cycle process is used to generate electrical power, combustion of gaseous fuels produces exhaust gases contaminated with carbon dioxide that contribute to global warming and environmental damage. Such gas streams are difficult to treat in ways that are both technically and economically practical, and there remains a need for better treatment techniques. Treatment is also needed for exhaust gases produced by other fossil fuel-burning furnaces, ovens, and boilers.

Gas separation by means of membranes is a well-established technology. In an industrial setting, a total pressure difference is usually applied between the feed and permeate sides, typically by compressing the feed stream or maintaining the permeate side of the membrane under partial vacuum.

Although permeation by creating a feed to permeate pressure difference is the most common process, it is known in the literature that a driving force for transmembrane permeation may be supplied by passing a sweep gas across the permeate side of the membranes, thereby lowering the partial pressure of a desired permeant on that side to a level below its partial pressure on the feed side. In this case, the total pressure on both sides of the membrane may be the same, the total pressure on the permeate side may be higher than on the feed side, or there may be additional driving force provided by keeping the total feed pressure higher than the total permeate pressure.

Using a sweep gas has most commonly been proposed in connection with air separation to make nitrogen or oxygen-enriched air, or with dehydration. Examples of patents that teach the use of a sweep gas on the permeate side to facilitate air separation include U.S. Pat. Nos. 5,240,471; 5,500,036; and 6,478,852. Examples of patents that teach the use of a sweep gas in a dehydration process include U.S. Pat. Nos. 4,931,070 and 5,641,337.

Configuring the flow path within the membrane module so that the feed gas and sweep stream flow, as far as possible, countercurrent to each other is also known, and taught, for example in U.S. Pat. Nos. 5,681,433 and 5,843,209.

The use of a process including a membrane separation step operated in sweep mode for treating flue gas to remove carbon dioxide is taught in co-owned, allowed U.S. patent application Ser. No. 12/734,941 (hereinafter referred to as "the '941 application"), filed Jun. 2, 2010, and in co-pending U.S. patent application Ser. Nos. 12/807,846, filed Sep. 13, 2010; 13/071,331, filed Mar. 24, 2011; 13/122,136, filed Mar. 31, 2011; 13/123,342 and 13/123,364, both filed Apr. 8, 2011.

SUMMARY OF THE INVENTION

Embodiments of the invention pertain to combustion systems and power plants which incorporate sweep-based membrane separation units to control carbon dioxide emissions from combustion processes.

Such combustion processes occur throughout industrialized society. Representative processes include those in which the combustion step is used to provide heat for an oven or furnace, such as a blast furnace or a rotary kiln, for example, a lime or cement kiln. Other important processes are those in which combustion gases are used as a source of power to drive a gas turbine or the like, and these gases may be treated before or after they have been used in the turbine. In yet other processes, the combustion gases are used to boil water to generate steam, which is then used to operate a steam turbine or other equipment to perform mechanical work or generate electric power, as in a combined cycle power generation process, as discussed above. Further examples of combustion processes are those used to supply heat for refinery operations, such as certain types of cracking or reforming.

Combustion exhaust streams or off-gases are typically referred to as flue gas and, as discussed above, arise in large quantities from ovens, furnaces, and boilers in all sectors of industry. In particular, power plants generate enormous amounts of flue gas. A modestly sized 100 megawatt coal-based power plant may produce over 300 MMscfd of flue gas.

The major components of combustion exhaust gases are normally nitrogen, carbon dioxide, and water vapor. Other components that may be present, typically only in small amounts, include oxygen, hydrogen, $SO_x$, $NO_x$, and unburnt hydrocarbons. The carbon dioxide concentration in the flue gas is generally up to about 20 vol %.

In addition to gaseous components, combustion flue gas typically contains suspended particulate matter in the form of fly ash and soot. This material is usually removed by several stages of filtration before the gas is sent to the stack. It is assumed herein that the flue gas has already been treated in this way, if necessary, prior to treatment using the apparatus of the invention.

The combustion systems and power plants of the invention are configured to treat the exhaust gas to remove carbon dioxide. In preferred embodiments, the carbon dioxide level of the exhaust gas is reduced to as low as 5 vol % or less, and most preferably, to 3 vol % or less. Discharge of such a stream to the environment is much less damaging than discharge of the untreated exhaust.

The combustion process from which the exhaust is drawn may be of any type. The fuel may be a solid fuel (such as coal, biomass, or other combustible solid waste), a liquid fuel (such as oil), or a gaseous fuel (such as natural gas, syngas, refinery fuel gas, blast furnace off-gas, or landfill gas), for example and without limitation. The fuel is typically combusted by mixing with air, oxygen-enriched air, or pure oxygen.

In the '846 application (to which the present application claims priority), we taught a process for controlling carbon dioxide from combustion processes, a basic embodiment of which includes three steps: a combustion step, a carbon dioxide capture step, and a sweep-based membrane separation step, where the carbon dioxide capture step and membrane separation step are performed in parallel with each other.

The process disclosed in the '846 application is operated according to the following basic flow scheme:

(a) performing a combustion process by combusting a mixture of a fuel and air, oxygen-enriched air, or oxygen, thereby creating an exhaust stream comprising carbon dioxide and nitrogen;

(b) performing a carbon dioxide capture step to remove a portion of carbon dioxide in concentrated form from a first portion of the exhaust stream;

(c) providing a membrane having a feed side and a permeate side, and being selectively permeable to carbon dioxide over nitrogen and to carbon dioxide over oxygen;

(d) passing a second portion of the exhaust stream across the feed side;

(e) passing air, oxygen-enriched air or oxygen as a sweep stream across the permeate side;

(f) withdrawing from the feed side a carbon-dioxide depleted vent stream;

(g) withdrawing from the permeate side a permeate stream comprising oxygen and carbon dioxide; and (h) passing the permeate stream to step (a) as at least part of the air, oxygen-enriched air or oxygen used in step (a).

We now disclose combustion systems and power plants that are configured to perform the process taught in the '846 application.

The most basic embodiment of the present invention is a combustion system adapted to control carbon dioxide emissions. The system includes three discrete units: a combustion unit, a carbon dioxide capture unit, and a sweep-based membrane separation unit, where the carbon dioxide capture unit and the sweep-based membrane separation unit are configured to be operated in parallel, by which we mean that each unit is adapted to receive exhaust gases from the combustion unit without such gases first passing through the other unit.

Accordingly, disclosed herein is a combustion system comprising the following components:

(a) a combustion unit configured to combust a mixture of fuel and air, oxygen-enriched air, or oxygen, thereby producing an exhaust stream containing carbon dioxide;

(b) a carbon dioxide capture unit configured to accept a first portion of the exhaust stream and remove a portion of carbon dioxide in concentrated form; and (c) a sweep-based membrane separation unit configured to accept a second portion of the exhaust stream, where the membrane separation unit comprises (i) at least one membrane having a feed side and a permeate side, where the at least one membrane is selectively permeable to carbon dioxide over nitrogen and to carbon dioxide over oxygen, (ii) means for passing a second portion across the feed side of the at least one membrane, (iii) means for passing air, oxygen-enriched air, or oxygen as a sweep stream across the permeate side of the at least one membrane, (iv) means for withdrawing from the feed side of the at least one membrane a carbon-dioxide depleted vent stream, and (v) means for withdrawing from the permeate side of the at least one membrane a permeate stream comprising oxygen and carbon dioxide, and to pass the permeate stream to the combustion unit as at least part of the air, oxygen-enriched air, or oxygen to the combustion unit.

The combustion unit may be part of a power generation plant or, alternatively, may be an oven, a furnace, or a boiler, for example and not by way of limitation.

The fuel may be a solid fuel (such as coal, biomass, or other combustible solid waste), a liquid fuel (such as oil), or a gaseous fuel (such as natural gas, syngas, refinery fuel gas, blast furnace off-gas, or landfill gas), for example and without limitation.

A first portion of the carbon dioxide-containing exhaust stream generated by the combustion unit is sent to a carbon dioxide capture unit, which may utilize any technology suitable for recovering carbon dioxide from a stream of the exhaust gas concentration. Preferred technologies include absorption (such as amine scrubbing or chilled ammonia sorption), adsorption, liquefaction, membrane separation, or any combination thereof, for example and without limitation.

The capture unit removes a portion of the carbon dioxide from the emissions stream, and preferably provides it in the form of a concentrated stream, such as greater than 60, 70, or 80 vol % carbon dioxide, and most preferably as a supercritical fluid or liquid high purity product. The concentrated product stream may be sent for sequestration, or for any other use.

When the capture unit is a membrane separation unit, the membrane unit is typically, but not necessarily, operated using a compressor to compress the gas entering the feed side of the membrane, a vacuum pump to reduce the pressure on the permeate side of the membrane, or both.

Many membrane materials are very permeable to water vapor, so the permeate stream from the membrane unit will tend to contain high concentrations of water vapor, such as 20 vol %, 30 vol %, or more. The co-permeation of water with the carbon dioxide is helpful, as the water dilutes the carbon dioxide concentration on the permeate side and helps maintain driving force for transmembrane permeation for carbon dioxide.

Optionally, the beneficial effect of copermeation of water can be maintained or enhanced by adding water vapor to the first membrane feed stream if it is not saturated, or by injecting steam or water vapor between the individual membrane modules, especially towards the residue end of the train of modules.

As another alternative, the driving force in the membrane separation step may be augmented by using a steam sweep on the permeate side of the membrane.

In all these cases, after the permeate stream is withdrawn from the membrane unit, the permeate stream may be cooled to condense the water, then compressed to produce a fluid carbon dioxide product for sequestration or use.

A second portion of the exhaust stream from the combustion unit is sent for treatment in a membrane separation unit that contains membranes selectively permeable to carbon dioxide over nitrogen and to carbon dioxide over oxygen. It is preferred that the membranes provide a carbon dioxide permeance of at least about 300 gpu, more preferably at least about 500 gpu and, most preferably, at least about 1,000 gpu, under process operating conditions. A carbon dioxide/nitrogen selectivity of at least about 10 or more, preferably 20, under process operating conditions is also desirable.

The membrane separation unit may include a single membrane module, but in most cases will include multiple membrane modules arranged in a series of parallel flow arrangements, as is well-known in the art. Any number of membrane modules may be used.

Membrane modules capable of operating under permeate sweep conditions may be used. Preferably, the modules take the form of hollow-fiber modules, plate-and-frame modules, or spiral-wound modules. All three module types are known, and their configuration and operation in sweep, including counterflow sweep modes, is described in the literature.

The second portion of the exhaust stream from the combustion unit flows across the feed side of the membranes in the sweep unit, and a sweep gas of air, oxygen-enriched air, or oxygen flows across the permeate side, to provide or augment the driving force for transmembrane permeation. It is highly preferred that the feed gas flow direction across the membrane on the feed side and the sweep gas flow direction across the membrane on the permeate side are substantially countercurrent to each other. In the alternative, the relative flow directions may be substantially crosscurrent or, less preferred, cocurrent. Additionally, the process may be augmented by operating the membrane unit with higher total pressure on the feed side than on the permeate side, thereby increasing the transmembrane driving force for permeation.

The sweep stream picks up the preferentially permeating carbon dioxide. The carbon dioxide-containing sweep/permeate stream is then withdrawn from the membrane unit and is returned to the combustion unit to form at least part of the air, oxygen-enriched air, or oxygen feed to the combustion unit.

By using the oxygen-containing stream destined for the combustion unit as sweep gas, the membrane separation step is carried out in a very efficient manner, and without introducing any additional unwanted components into the combustion unit. Further, circulation of the permeate stream back to the combustion unit is advantageous, as it helps to build up the carbon dioxide concentration that passes to the carbon dioxide capture unit, facilitating good carbon dioxide removal.

The residue (vent) stream from the membrane unit is reduced in carbon dioxide content to less than about 5 vol %, more preferably to less than 3 vol % and, most preferably, to less than 2 vol %. This stream is typically, although not necessarily, discharged to the environment. The reduction of the carbon dioxide content to 20 vol %, 10 vol %, or less of the content in the raw exhaust stream significantly reduces the environmental impact of discharging this stream.

The combustion system of the invention is particularly useful in applications that are energy-sensitive (as is almost always the case when the very large streams from power plants and the like are to be processed) and is also particularly useful in separations that are pressure-ratio limited, as will be explained in more detail below.

A preferred embodiment of the present invention is a power plant configured to control carbon dioxide exhaust from combustion processes performed therein. The power plant comprises:

(a) a combustion unit configured to combust a mixture of fuel and air, oxygen-enriched air, or oxygen, thereby producing an exhaust stream containing carbon dioxide;

(b) a power generation system adapted to generate electricity by extracting energy from the exhaust stream;

(c) a carbon dioxide capture unit configured to accept a first portion of the exhaust stream and remove a portion of carbon dioxide in concentrated form; and (d) a sweep-based membrane separation unit configured to accept a second portion of the exhaust stream, where the membrane separation unit comprises (i) at least one membrane having a feed side and a permeate side, where the at least one membrane is selectively permeable to carbon dioxide over nitrogen and to carbon dioxide over oxygen, (ii) means for passing the second portion across the feed side of the at least one membrane, (iii) means for passing air, oxygen-enriched air, or oxygen as a sweep stream across the permeate side of the at least one membrane, (iv) means for withdrawing from the feed side of the at least one membrane a carbon-dioxide depleted vent stream, and (v) means for withdrawing from the permeate side of the at least one membrane a permeate stream comprising oxygen and carbon dioxide, and to pass the permeate stream to the combustion unit as at least part of the air, oxygen-enriched air, or oxygen to the combustion unit.

The power generation unit may be any unit able to convert heat or pressure energy contained in the exhaust gas to electrical energy. Typically, the power generation unit will include a prime mover to convert energy contained in the exhaust gas to mechanical energy, such as a turbine or engine, and an electricity generator coupled to the prime mover. By way of non-limiting example, the prime mover may be a gas turbine unit or a steam turbine unit, or the plant may be a combined cycle power plant comprising both a gas turbine unit and a steam turbine unit (as discussed above in the "Background of the Invention")

DETAILED DESCRIPTION OF THE INVENTION

Gas percentages given herein are by volume unless stated otherwise.

Pressures as given herein are in bar absolute unless stated otherwise.

The terms exhaust gas, off-gas, flue gas, and emissions stream are used interchangeably herein.

Embodiments of the invention pertain to combustion systems and power plants that incorporate sweep-based membrane separation units to control carbon dioxide emissions from combustion processes.

Figure 1:
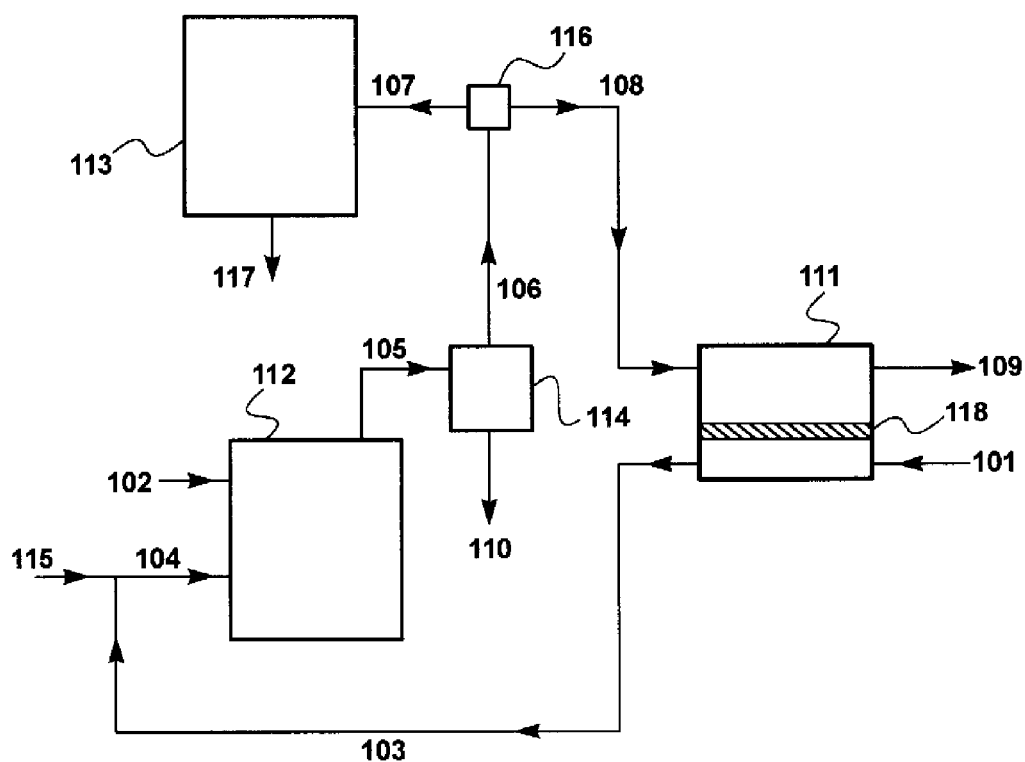
FIG. 1 is a schematic drawing of a basic embodiment of the combustion system of the invention.

The most basic embodiment of the present invention is a combustion system adapted to control carbon dioxide emissions. Referring to FIG. 1, this system includes three discrete units: a combustion unit 112, a carbon dioxide capture unit 113, and a sweep-based membrane separation unit 111. The carbon dioxide capture unit 113 and the sweep-based membrane separation unit 111 are configured to operate in parallel with each other, such that a portion of the exhaust stream from the combustion unit is routed to the carbon dioxide capture unit, and the other portion is routed to the sweep-based membrane separation unit.

Referring to FIG. 1, fuel stream 102 and air, oxygen-enriched air, or oxygen stream 104 are introduced into combustion unit 112 by means of corresponding gas flow lines. Stream 104 is made up of sweep stream 103 (discussed below) and, optionally, additional air or oxygen supply stream 115.

As discussed above, the combustion unit may be part of a power generation plant or, alternatively, may be an oven, a furnace, or a boiler, for example and not by way of limitation.

The fuel may be a solid fuel (such as coal, biomass, or other combustible solid waste), a liquid fuel (such as oil), or a gaseous fuel (such as natural gas, syngas, refinery fuel gas, blast furnace off-gas, or landfill gas), for example and without limitation.

Combustion exhaust stream 105—preferably containing at least 15 vol %; more preferably, at least 20 vol %; and, most preferably, at least 25 vol %, carbon dioxide—is withdrawn from combustion unit 112 by means of a corresponding gas flow line. This stream usually contains at least carbon dioxide, water vapor, and nitrogen, as well as the other components mentioned in the Summary section above. Combustion exhaust stream 105 is optionally but typically routed by means of a corresponding gas flow line through a condenser 114, where the stream is cooled, knocking out excess water 110. The dehydrated exhaust stream 106 is then typically routed by means of a corresponding gas flow line through a valve or splitter 116, where it is divided in a desired ratio into a first portion 107 and a second portion 108.

The first portion 107 of exhaust stream 106 is routed by means of a corresponding gas flow line to a carbon dioxide capture unit 113. The carbon dioxide capture unit may employ any technology or combination of technologies that can create a concentrated carbon dioxide stream from the combustor exhaust stream. Treatment of the first portion 107 of exhaust stream 106 in the capture unit 113 yields a concentrated carbon dioxide product stream 117 preferably containing greater than 60, 70, or 80 vol % carbon dioxide or more. This stream may be in the gas or liquid phase, or may be a supercritical fluid. The concentrated stream 117 may be sent for further processing in a sequestration step (not shown) to yield a liquid carbon dioxide product, for example, but alternatively may be used or disposed of in any other appropriate way.

The carbon dioxide capture unit 113 may employ membrane or non-membrane technology, and may involve one or more than one type of separation procedure. In the event that membrane technology is used in whole or part for the carbon dioxide capture, the capture unit 113 remains a discrete unit separate from the parallel sweep-based membrane separation unit 111.

Representative carbon dioxide capture units include absorption units, adsorption units, cryogenic or low temperature condensation (i.e., liquefaction) units, membrane separation units, and combinations thereof.

Low-temperature or cryogenic condensation and absorption into an amine solution are the most common methods in current industrial use for capturing carbon dioxide and need no detailed description herein. Either method is well-suited for use in the present invention. Methods of recovering liquid carbon dioxide by cryogenic condensation or distillation are well known in the art. A preferred process is the well-known Ryan-Holmes process, in which a light hydrocarbon liquid or liquid mixture is added to the column to prevent formation of carbon dioxide solids or azeotropes in the column. Various specific techniques for carrying out low temperature condensation are taught, for example, in U.S. Pat. Nos. 4,371,381; 4,923,493; and 5,233,837. The Ryan-Holmes process is taught in U.S. Pat. Nos. 4,350,511 and 4,462,814, for example.

Methods of recovering carbon dioxide by absorption are also commonly used. In brief, these methods involve absorbing the carbon dioxide into a sorbent solution by physical or chemical interaction, then stripping the gas from the solution and recirculating the regenerated sorbent. Various sorbents may be used; most commonly, the sorbent is amine-based and may include a single alkanolamine or a mix of amines. Other sorbents that may be used include chilled ammonia, as in the Alstom process, or other specialized proprietary solvents, such as Rectisol® and Selexol®

The sorbent solution may be regenerated by steam stripping, and the carbon dioxide recovered from the stripping vapor by cooling and condensing the water. A representative process of this type is the Fluor Daniel Econamine FG™ process, which utilizes a monoethanolamine (MEA) based sorbent system. Very detailed descriptions of such processes can be found in the literature, for example, in *Gas Purification*, A. Kohl and R. Nielsen (Fifth Edition, Gulf Publishing Co., Houston, Tex., 1997), pages 1188-1237.

It is less preferred to use membrane separation alone for the carbon dioxide capture step, as it is difficult to attain a high carbon dioxide concentration in the permeate stream without using multiple membrane stages. For this reason, if membrane separation is employed in the carbon dioxide capture unit, it is preferred that the carbon dioxide capture unit comprises two or more membrane separation units. An example of a three-stage membrane unit for carbon dioxide recovery from natural gas streams is given in U.S. Pat. No. 6,648,944.

Two or more different separation technologies may also be combined in this step, for example, membrane separation may be combined with cryogenic condensation, either upstream or downstream of the condensation step, or gas released in the stripping step of the absorption process may be liquefied by condensation. Examples of such combined processes are taught in U.S. Pat. Nos. 4,639,257; 4,990,168; 5,233,837; and 6,085,549, all of which are incorporated herein by reference in their entireties.

A second portion 108 of combustion exhaust stream 106 is sent by means of a corresponding gas flow line for treatment in sweep-based membrane separation unit 111. The membrane separation unit 111 contains membranes 118 that exhibit high permeance for carbon dioxide, as well as high selectivity for carbon dioxide over nitrogen.

Any membranes with suitable performance properties may be used. Many polymeric materials, especially elastomeric materials, are very permeable to carbon dioxide. Preferred membranes for separating carbon dioxide from nitrogen or other inert gases have a selective layer based on a polyether. A number of such membranes are known to have high carbon dioxide/nitrogen selectivity, such as 30, 40, 50, or above. A representative preferred material for the selective layer is Pebax®, a polyamide-polyether block copolymer material described in detail in U.S. Pat. No. 4,963,165.

The membrane may take the form of a homogeneous film, an integral asymmetric membrane, a multilayer composite membrane, a membrane incorporating a gel or liquid layer or particulates, or any other form known in the art. If elastomeric membranes are used, the preferred form is a composite membrane including a microporous support layer for mechanical strength and a rubbery coating layer that is responsible for the separation properties.

The membranes may be manufactured as flat sheets or as fibers and housed in any convenient module form, including spiral-wound modules, plate-and-frame modules, and potted hollow-fiber modules. The making of all these types of membranes and modules is well-known in the art. To provide countercurrent flow of the sweep gas stream, the modules preferably take the form of hollow-fiber modules, plate-and-frame modules, or spiral-wound modules.

Flat-sheet membranes in spiral-wound modules is the most preferred choice for the membrane/module configuration. A number of designs that enable spiral-wound modules to be used in counterflow mode with or without sweep on the permeate side have been devised. A representative example is described in U.S. Pat. No. 5,034,126, to Dow Chemical.

Membrane unit 111 may contain a single membrane module or bank of membrane modules or an array of modules. A single unit or stage containing one or a bank of membrane modules is adequate for many applications. If the residue stream requires further purification, it may be passed to a second bank of membrane modules for a second processing step. If the permeate stream requires further concentration, it may be passed to a second bank of membrane modules for a second-stage treatment. Such multi-stage or multi-step processes, and variants thereof, will be familiar to those of skill in the art, who will appreciate that the membrane separation step may be configured in many possible ways, including single-stage, multistage, multistep, or more complicated arrays of two or more units, in serial or cascade arrangements.

Turning to the operating conditions of membrane unit 111, the separation of components achieved by the membrane unit depends not only on the selectivity of the membrane for the components to be separated, but also on the pressure ratio.

By pressure ratio, we mean the ratio of total feed pressure/total permeate pressure. In pressure-driven processes, it can be shown mathematically that the enrichment of a component (that is, the ratio of component permeate partial pressure/component feed partial pressure) can never be greater than the pressure ratio. This relationship is true, irrespective of how high the selectivity of the membrane may be.

Further, the mathematical relationship between pressure ratio and selectivity predicts that whichever property is numerically smaller will dominate the separation. Thus, if the numerical value of the pressure ratio is much higher than the selectivity, then the separation achievable in the process will not be limited by the pressure ratio, but will depend on the selectivity capability of the membranes. Conversely, if the membrane selectivity is numerically very much higher than the pressure ratio, the pressure ratio will limit the separation. In this case, the permeate concentration becomes essentially independent of the membrane selectivity and is determined by the pressure ratio alone.

High pressure ratios can be achieved by compressing the feed gas to a high pressure or by using vacuum pumps to create a lowered pressure on the permeate side, or a combination of both. However, the higher the selectivity, the more costly in capital and energy it becomes to achieve a pressure ratio numerically comparable with or greater than the selectivity.

From the above, it can be seen that pressure-driven processes using membranes of high selectivity for the components to be separated are likely to be pressure-ratio limited. For example, a process in which a membrane selectivity of 40, 50, or above is possible (such as is the case for many carbon dioxide/nitrogen separations) will only be able to take advantage of the high selectivity if the pressure ratio is of comparable or greater magnitude.

The inventors have overcome this problem and made it possible to utilize more of the intrinsic selective capability of the membrane by diluting the permeate with the sweep gas, stream 101, thereby preventing the permeate side concentration building up to a limiting level.

This mode of operation can be used with a pressure ratio of 1, that is, with no total pressure difference between the feed and permeate sides; with a pressure ratio less than 1, that is, with a higher total pressure on the permeate side than on the feed side; or, with a relatively modest pressure ratio of less than 10 or less than 5, for example.

The driving force for transmembrane permeation is supplied by lowering the partial pressure of the desired permeant on the permeate side to a level below its partial pressure on the feed side. The use of the sweep gas stream 101 maintains a low carbon dioxide partial pressure on the permeate side, thereby providing driving force.

The partial pressure on the permeate side may be controlled by adjusting the flow rate of the sweep stream to a desired value. In principle, the ratio of sweep gas flow to feed gas flow may be any value that provides the desired results, although the ratio sweep gas flow:feed gas flow will seldom be less than 0.1 or greater than 10. High ratios (that is, high sweep flow rate) achieve maximum carbon dioxide removal from the feed, but a comparatively carbon dioxide dilute permeate stream (that is, comparatively low carbon dioxide enrichment in the sweep gas exiting the modules). Low ratios (that is, low sweep flow rate) achieve high concentrations of carbon dioxide in the permeate, but relatively low levels of carbon dioxide removal from the feed.

Use of a too low sweep rate may provide insufficient driving force for a good separation, and use of an overly high sweep flow rate may lead to pressure drop or other problems on the permeate side, or may adversely affect the stoichiometry in the reaction vessel.

Typically and preferably, the flow rate of the sweep stream should be between about 50% and 200% of the flow rate of the membrane feed stream, and most preferably between about 80% and 120%. Often a ratio of about 1:1 is convenient and appropriate.

The total gas pressures on each side of the membrane may be the same or different, and each may be above or below atmospheric pressure. As mentioned above, if the pressures are about the same, the entire driving force is provided by the sweep mode operation.

In most cases, however, flue gas is available at atmospheric pressure, and the volumes of the streams involved are so large that it is not preferred to use either significant compression on the feed side or vacuum on the permeate side. However, slight compression, such as from atmospheric to 2 or 3 bar, can be helpful and can provide part of a total carbon dioxide capture and recovery process that is relatively energy efficient, as shown in the examples below.

Returning to FIG. 1, the second portion 108 of combustion exhaust stream 106 flows across the feed side of the membranes; a sweep gas of air, oxygen-enriched air, or oxygen stream 101, flows across the permeate side. The sweep stream picks up the preferentially permeating carbon dioxide, and the resulting permeate stream 103 is withdrawn by means of a corresponding gas flow line from the membrane unit 111 and is combined with stream 115 to form the air or oxygen feed 104 to the combustor 112. In the alternative, stream 115 may be omitted and the entirety of the oxygen-containing feed to the combustor may be provided by the permeate stream 103.

As discussed previously, one of the additional benefits of using the combustion air or oxygen supply as the permeate sweep is that the permeating carbon dioxide removed into the sweep gas is recycled to the combustion chamber. This increases the carbon dioxide concentration in the exhaust gas leaving the combustor, facilitating the downstream capture of carbon dioxide.

The residue stream 109 coming from the membrane sweep unit 111 is reduced in carbon dioxide content to less than about 5 vol %, more preferably, to less than 3 vol %; and, most preferably, to less than 2 vol %. The residue stream 109 is discharged to the environment as treated flue gas.

The proportions of the flue gas that are directed to the carbon dioxide capture unit and the sweep-based membrane separation unit may be adjusted in conjunction with other operating parameters to tailor the processes of the invention to specific circumstances.

One of the goals of the invention is to increase the carbon dioxide concentration in the feed stream to the carbon dioxide capture unit, because many capture technologies, such as amine scrubbing and cryogenic condensation, have capital and/or operating costs that scale with the concentration of the component to be captured. The membrane separation unit preferentially permeates carbon dioxide and returns it to the combustor, thereby forming a loop between the combustor and the membrane unit in which the carbon dioxide concentration can build up.

The more exhaust gas that is directed to the membrane unit, in other words, the smaller the split ratio, the greater is the potential to increase the carbon dioxide concentration in the loop. However, the amount of membrane area needed will increase in proportion to the volume flow of gas directed to the membrane unit. Furthermore, most membrane materials have slight selectivity for oxygen over nitrogen, so a little oxygen from the air sweep stream will tend to counter-permeate to the feed side of the membranes and be lost in the residue stream. In consequence, the concentration of oxygen in the combustor may drop, giving rise to the possibility of incomplete combustion, coke formation on boiler components, or other problems. As illustrated by the calculations given in the Examples section below, we have discovered that trade-offs exist between the degree of carbon dioxide enrichment that can be obtained by the membrane separation steps, the amount of oxygen lost into the residue stream, and the membrane area and compression requirements to operate the membrane separation unit.

In light of these trade-offs, we believe that it is preferable to operate the process at a split ratio of between 1:10 and 3:1. A split ratio of 1:1 means that splitter, 116, divides the total flue gas flow from the combustor into two equal portions by volume, so that 50 vol % passes to the carbon dioxide capture unit and 50 vol % passes to the membrane separation unit. Likewise, a split ratio of 1:10 means that 9 vol % passes to the carbon dioxide capture unit and 91 vol % passes to the membrane separation unit, and so on. More preferably, we prefer to operate at a split ratio between 1:4 and 2:1; that is, with between 20 vol % and 65 vol % of the exhaust being directed to the carbon dioxide capture unit. We have discovered that operating in this range will provide a good balance between efficiency and costs for most processes.

The choice of the optimum split ratio will depend on many case-dependent factors. For example, in certain cases, the gas may be burnt with an excess of air, so that the flue gas produced only contains 4-6 vol % carbon dioxide and 10-15 vol % oxygen. This low carbon dioxide concentration makes capture of carbon dioxide for sequestration expensive. As shown in the Examples that follow, this concentration can be increased to 30 vol % (a six-fold increase) or more by using the membrane process with a large split ratio (1:5 or even 1:10). A large split ratio implies a large membrane area (capital cost) for unit 112 in FIG. 1, but this is offset by the smaller size of the carbon dioxide capture unit 113.

In certain cases, the gas being burnt already contains some carbon dioxide, so the flue gas produced can contain 20 vol % carbon dioxide or more. In this case, although increasing the carbon dioxide concentration in the stream going to the capture process is beneficial, increasing the concentration more than two-fold begins to reach a point of diminishing returns. In this case, the split ratio will be smaller—perhaps 1:1 or 1:2—as the trade-off between the cost of the membrane unit 111 required to the cost of the carbon dioxide capture unit 113 favors a low split ratio.

Figure 2:
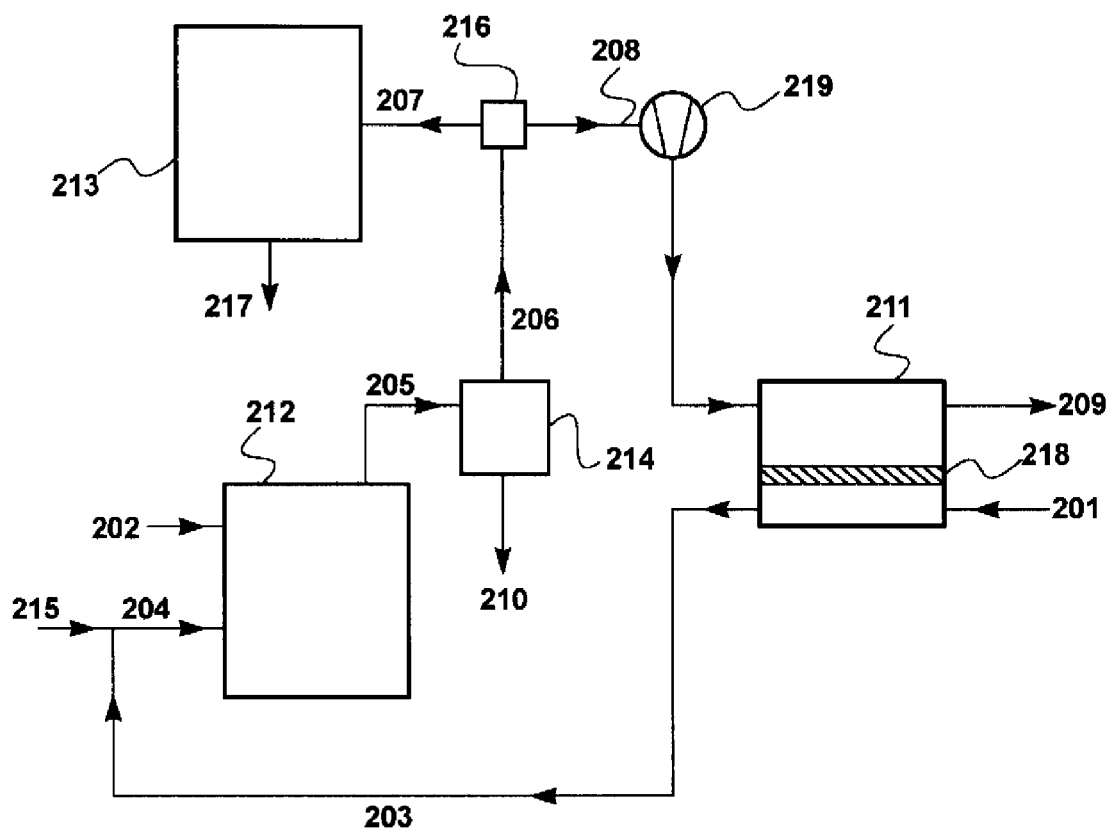
FIG. 2 is a schematic drawing of an embodiment of the combustion system of the invention in which a compressor is situated upstream of the sweep-based membrane separation unit.

FIG. 2 is a schematic drawing of a combustion system of the invention in which the portion of the exhaust stream being routed to the sweep-based membrane separation unit is passed through a compressor prior to being sent to the membrane separation unit. Such embodiments are preferred in situations where the energy costs of the compression step can be tolerated, such as when energy can be recovered in a turbo-expander.

Referring to FIG. 2, fuel stream 202 and air, oxygen-enriched air, or oxygen stream 204 are introduced into combustion unit 212 by means of corresponding gas flow lines. Stream 204 is made up of sweep stream 203 and, optionally, additional air or oxygen supply stream 215.

Combustion exhaust stream 205—preferably containing at least 15 vol %; more preferably, at least 20 vol %; and, most preferably, at least 25 vol %, carbon dioxide—is withdrawn by means of a corresponding gas flow line from combustion unit 212. Combustion exhaust stream 205 is typically routed by means of a corresponding gas flow line through a condenser 214, where water 210 is knocked out of the stream. The dehydrated exhaust stream 206 is then routed by means of a corresponding gas flow line through valve or splitter 216, where it is divided in a desired ratio into first portion 207 and second portion 208.

The first portion 207 of exhaust stream 206 is routed by means of a corresponding gas flow line to carbon dioxide capture unit 213, which yields a concentrated carbon dioxide product stream 217.

The second portion 208 of combustion exhaust stream 206 is then routed by means of a corresponding gas flow line through a compressor 219, where it is compressed to a pressure of up to about 5 bar—such as 2 bar—prior to being sent for treatment in membrane separation unit 211, which contains membranes 218 that exhibit high permeance for carbon dioxide, as well as high selectivity for carbon dioxide over nitrogen.

The second portion 208 of combustion exhaust stream 206 flows across the feed side of the membranes; a sweep gas of air, oxygen-enriched air, or oxygen stream 201, flows across the permeate side. The sweep stream picks up the preferentially permeating carbon dioxide, and the resulting permeate stream 203 is withdrawn from the membrane unit by means of a corresponding gas flow line, and is combined with stream 215 to form the air or oxygen feed 204 to the combustor. In the alternative, stream 215 may be omitted and the entirety of the oxygen-containing feed to the combustor may be provided by the permeate stream 203.

The residue stream 209 coming from the membrane sweep unit, which is discharged to the environment as treated flue gas, is reduced in carbon dioxide content to less than about 5 vol %, more preferably, to less than 4 vol %; and, most preferably, to less than 3 vol %.

Figure 3:
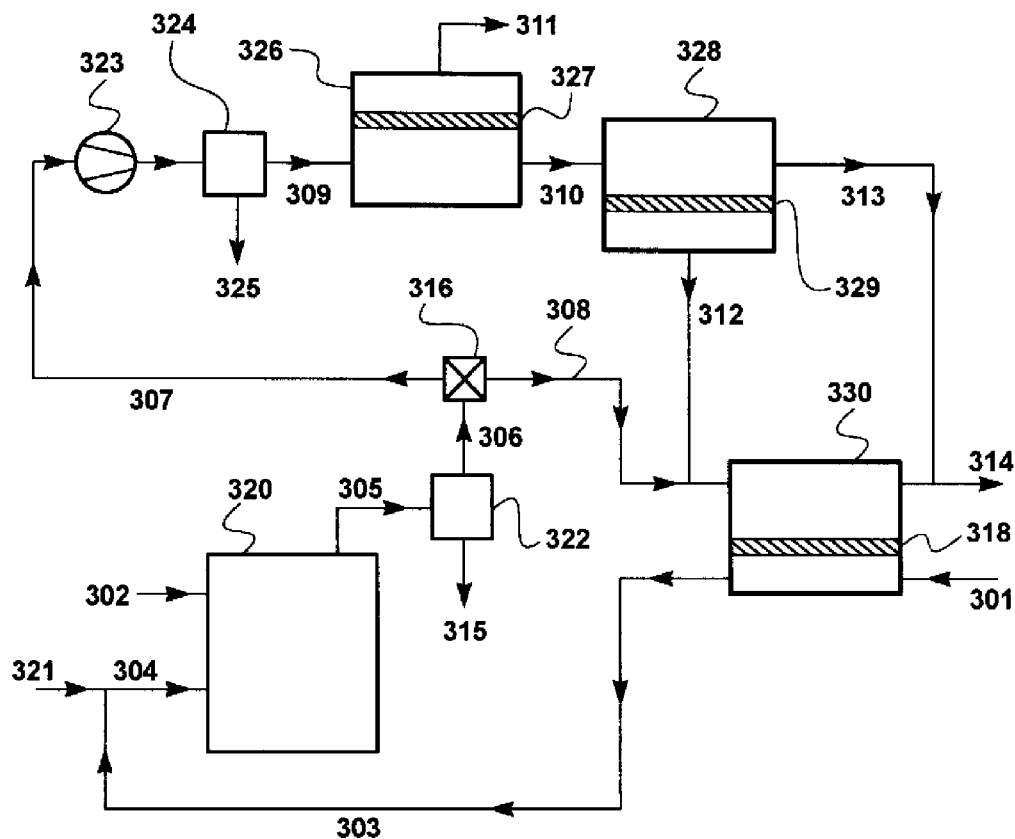
FIG. 3 is a schematic drawing of an embodiment of the combustion system of the invention in which the carbon dioxide capture unit comprises two membrane-based capture units.

FIG. 3 is a schematic drawing of a combustion system of the invention in which the carbon dioxide capture unit comprises two membrane-based capture units.

Referring to FIG. 3, fuel stream 302 and air, oxygen-enriched air, or oxygen stream 304 are introduced into combustion unit 320 by means of corresponding gas flow lines. Stream 304 is made up of sweep stream 303 and, optionally, additional air or oxygen supply stream 321.

Combustion exhaust stream 305—preferably containing at least 15 vol %; more preferably, at least 20 vol %; and, most preferably, at least 25 vol %, carbon dioxide—is withdrawn by means of a corresponding gas flow line from combustion unit 320. Combustion exhaust stream 305 is typically routed by means of a corresponding gas flow line through a condenser 322, where water 315 is knocked out of the stream. The dehydrated exhaust stream 306 is then routed by means of a corresponding gas flow line through valve or splitter 316, where it is divided in a desired ratio into first portion 307 and second portion 308.

The first portion 307 of exhaust stream 306 is then routed by means of a corresponding gas flow line through a compressor 323, where it is compressed to a pressure of up to about 5 bar, followed by a condenser 324, where water 325 is knocked out of the stream. The dehydrated stream 309 is routed by means of a corresponding gas flow line to a carbon dioxide capture unit, which in this embodiment comprises two membrane-based capture units, 326 and 328. The membrane units 326 and 328 contain membranes 327 and 329, respectively, that exhibit high permeance for carbon dioxide, as well as high selectivity for carbon dioxide over nitrogen.

The permeate stream 311 from the first membrane unit 326 yields a high-purity carbon dioxide product. The residue stream 310 from the first membrane unit 326 is routed by means of a corresponding gas flow line to second membrane unit 328 to remove carbon dioxide remaining in the first residue stream before the stream is discharged. The permeate stream 312 from the second membrane unit 328 is passed by means of a corresponding gas flow line to the sweep-based membrane separation unit 330. The carbon-dioxide depleted residue stream 313 is typically exhausted to the environment.

The second portion 308 of combustion exhaust stream 306 and the permeate stream 312 from the second membrane-based capture unit 328 are then sent by means of corresponding gas flow lines for treatment in membrane separation unit 330, which contains membranes 318 that exhibit high permeance for carbon dioxide, as well as high selectivity for carbon dioxide over nitrogen. The second portion 308 of combustion exhaust stream 306 and the permeate stream 312 from the second membrane-based capture unit 328 flow across the feed side of the membranes; a sweep gas of air, oxygen-enriched air, or oxygen stream 301, flows across the permeate side. The sweep stream picks up the preferentially permeating carbon dioxide, and the resulting permeate stream 303 is withdrawn from the membrane unit and is combined with stream 321 to form the air or oxygen feed 304 to the combustor. In the alternative, stream 321 may be omitted and the entirety of the oxygen-containing feed to the combustor may be provided by the permeate stream 303.

The residue stream 314 resulting from the membrane sweep unit 330, which is discharged to the environment as treated flue gas, is reduced in carbon dioxide content to less than about 5 vol %, more preferably, to less than 4 vol %; and, most preferably, to less than 3 vol %.

The invention is now further described by the following examples, which are intended to be illustrative of the invention, but are not intended to limit the scope or underlying principles in any way.

EXAMPLES

Example 1

Bases of Calculations for Other Examples (a) Membrane permeation experiments: Sets of permeation experiments were performed with two different composite membranes, each having a polyether-based selective layer. The properties of the membranes as measured with a set of pure gases at 6.7 bar absolute and 30° C. are shown in Tables 1 and 2.

TABLE 1

| Gas | Permeance (gpu)* | $CO_2$/Gas Selectivity |
| --- | --- | --- |
| Carbon dioxide | 1,000 | — |
| Nitrogen | 20 | 50 |
| Oxygen | 50 | 20 |
| Methane | 50 | 20 |
| Water | >2,000** | — |

*Gas permeation unit; 1 gpu = 1 × $10^{-6}$ $cm^3$(STP)/$cm^2$ · s · cmHg
**Estimated, not measured The following calculations were performed using the membrane properties shown in Table 2.

TABLE 2

| Gas | Permeance (gpu)* | $CO_2$/Gas Selectivity |
| --- | --- | --- |
| Carbon dioxide | 1,000 | — |
| Nitrogen | 30 | 33 |
| Oxygen | 60 | 17 |
| Hydrogen | 100 | 10 |
| Water | 5,000** | — |

*Gas permeation unit; 1 gpu = 1 × $10^{-6}$ $cm^3$(STP)/$cm^2$ · s · cmHg
**Estimated, not measured (b) Calculation methodology: The computer calculations in all of the following Examples were performed using a modeling program, ChemCad 5.6 (ChemStations, Inc., Houston, Tex.) containing code developed by assignee's engineering group for applications specific to assignee's processes. For the calculations, all compressors and vacuum pumps were assumed to be 75% efficient. In each case, the modeling calculation was performed to achieve about 80-90% recovery of carbon dioxide from the flue gas stream.

(c) "No membrane" example: A computer calculation was performed to determine the chemical composition of untreated flue gas from a coal combustion process. The calculation was performed assuming that the flue gas to be treated was from a 500 MW gross power coal-fired power plant. It was assumed that the exhaust gas is filtered to remove particulate matter before passing to the membrane separation steps.

Figure 4:
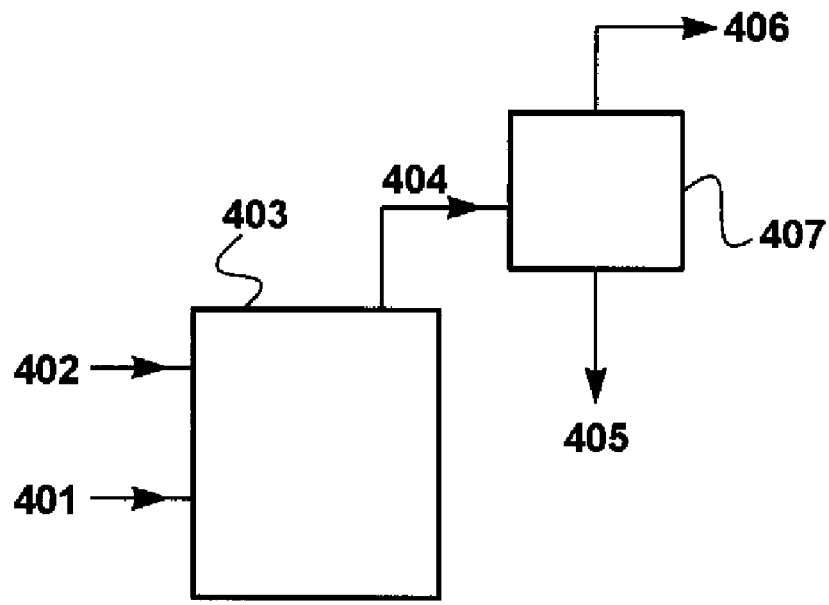
FIG. 4 is a schematic drawing of a flow scheme for a combustion process that does not include a sweep-based membrane separation step (not in accordance with the invention).

FIG. 4 is a schematic drawing of a flow scheme for a combustion process that does not include a sweep-based membrane separation step. Fuel stream 402 and air stream 401 are introduced into combustion step or zone 403. (The combustion step, the fuel for the combustion step, and the oxygen with which the fuel is combined are as described in the Detailed Description, above.)

Combustion exhaust stream 404 is withdrawn, then routed through a cooler/condenser 407, where water 405 is knocked out of the stream. The chemical composition of the resulting untreated flue gas stream 406 was then calculated. The results of this calculation are shown in Table 3.

TABLE 3

| Parameter/Stream | Coal (402) | Air Stream (401) | Condenser Knockout (405) | Flue Gas (406) |
| --- | --- | --- | --- | --- |
| Total Flow (kg/h) | 132,000 | 2,280,000 | 62,160 | 2,349,600 |
| Temperature (° C.) | 25 | 25 | 40 | 40 |
| Pressure (bar) | 1.0 | 1.0 | 1.0 | 1.0 |
| Component (vol %) | | | | |
| Coal (carbon + hydrogen) | 100.0 | 0 | 0 | 0 |
| Oxygen | 0 | 21.0 | 0 | 3.1 |
| Nitrogen | 0 | 79.0 | 0 | 77.8 |
| Carbon Dioxide | 0 | 0 | 0 | 11.7 |
| Water | 0 | 0 | 100 | 7.4 |

After the water vapor in the stream is condensed, the carbon dioxide concentration in the combustion exhaust stream is 11.7 vol %. Discharge of such a stream in its untreated form would release 10,000 tons of carbon dioxide into the atmosphere per day. On the other hand, the carbon dioxide concentration is too low to enable the stream to be treated economically by traditional means, such as absorption or low-temperature condensation.

Examples 2-8

Embodiments of the Invention: Modeling of Sweep-Based Membrane Separation Step and Effect on Combustion Step A set of calculations was performed to model the effect of various process parameters on the performance of the sweep-based membrane separation step and its effect on the combustion step. The calculations for Examples 2 through 8 were performed using the flow scheme shown in FIG. 1 and described in the Detailed Description, above. This flow scheme includes a sweep-based membrane separation step, 111.

To facilitate operation of the calculation software, the base case air flow provided to the combustor via the membrane permeate side was assumed to be about 740 $m^3$/h (950 kg/h), compared with the typical air flow to a 500 MW power plant of about 1.8 million $m^3$/h used for the calculation of Example 1. In other words, the scale of the calculations for Examples 2 through 8 was about 1/2,400 of the scale for a typical coal-fired power plant. This reduces membrane area proportionately, but does not affect the relative flow rates or compositions of the streams involved.

Example 2

Embodiment of the Invention

In this example, the membrane area was assumed to be 400 m$^2$, and the combustion exhaust stream split ratio was set at 1:1 (flow to carbon dioxide capture step:flow to sweep-based membrane separation step). The separation was assumed to be performed using a membrane having permeation properties as in Table 2. The results of this calculation are shown in Table 4.

TABLE 4

| Parameter/Stream | Coal (102) | Condenser Knockout (110) | Gas to Capture Step (107) | Membrane Feed (108) | Air Sweep (101) | Gas to Combustor (103) | Retentate (109) |
|---|---|---|---|---|---|---|---|
| Total Flow (kg/h) | 55 | 46 | 554 | 554 | 950 | 1100 | 404 |
| Temperature (° C.) | 25 | 40 | 40 | 40 | 25 | 33 | 25 |
| Pressure (bar) | 1.0 | 1.0 | 1.0 | 1.0 | 1.0 | 1.0 | 1.0 |
| Component (vol %) | | | | | | | |
| Coal (carbon + hydrogen) | 100 | 0 | 0 | 0 | 0 | 0 | 0 |
| Oxygen | 0 | 0 | 1.6 | 1.6 | 21.0 | 17.5 | 5.2 |
| Nitrogen | 0 | 0 | 71.8 | 71.8 | 79.0 | 70.6 | 91.9 |
| Carbon Dioxide | 0 | 0 | 19.2 | 19.2 | 0 | 8.3 | 2.9 |
| Water | 0 | 100 | 7.4 | 7.4 | 0 | 3.6 | 0 |

Compared with the "no membrane" Example 1, the carbon dioxide content in the combustion exhaust stream 107 sent to the capture step is increased from 11.7 vol % to 19.2 vol %, and compared to Example 1, the volume of gas to be treated by the carbon dioxide capture step 113 is reduced almost in half. This reduction in gas volume and increase in carbon dioxide concentration reduces the cost of carbon dioxide capture by essentially all capture technologies. This reduction in cost can then bring carbon dioxide capture from coal-fired power plants and other large carbon dioxide combustion gas streams into an economically acceptable range.

The carbon dioxide concentration in the membrane residue stream is reduced to 2.9 vol %, and venting of this stream to the atmosphere would release about 1,000 tons of carbon dioxide per day from a 500 MW power plant. Comparing this Example with Example 1, it can be seen that the process is effective in capturing 90% of the carbon dioxide emitted from the combustion section of the power plant.

As can also be seen, however, use of the incoming air as the permeate sweep stream reduces the oxygen content in the air to the combustor from the normal 21 vol % to 17.5 vol %. As a result, the mass flow of oxygen to the combustor is reduced from 221 kg/h in the conventional, no membrane case to 207 kg/h, and the oxygen content of the combustion exhaust stream, 108, is reduced to 1.6 vol %. The low exhaust oxygen concentration indicates that a real combustion process might be compromised under these conditions, and that insufficient oxygen mass flow would be available to achieve complete combustion without modifying the combustor. This is, therefore, a workable but less preferred process configuration.

Example 3

Embodiment of the Invention with Increased Air Flow

In this set of calculations, the air flow to the process via the permeate sweep stream was increased incrementally, until the oxygen mass flow to the combustor was comparable with that of Example 1, and the calculation showed an oxygen content of 3 vol % in the combustor exhaust stream. All other operating parameters, including split ratio and membrane area, were the same as in Example 2. The results of the calculation are shown in Table 5.

TABLE 5

| Parameter/Stream | Coal (102) | Condenser Knockout (110) | Gas to Capture Step (107) | Membrane Feed (108) | Air Sweep (101) | Gas to Combustor (103) | Retentate (109) |
|---|---|---|---|---|---|---|---|
| Total Flow (kg/h) | 55 | 44 | 596 | 596 | 1035 | 1182 | 450 |
| Temperature (° C.) | 25 | 40 | 40 | 40 | 25 | 33 | 25 |
| Pressure (bar) | 1.0 | 1.0 | 1.0 | 1.0 | 1.0 | 1.0 | 1.0 |
| Component (vol % | | | | | | | |
| Coal (carbon + hydrogen) | 100 | 0 | 0 | 0 | 0 | 0 | 0 |
| Oxygen | 0 | 0 | 3.2 | 3.2 | 21.0 | 17.8 | 6.6 |
| Nitrogen | 0 | 0 | 72.0 | 72.0 | 79.0 | 71.1 | 90.3 |
| Carbon Dioxide | 0 | 0 | 17.4 | 17.4 | 0 | 7.4 | 3.1 |
| Water | 0 | 100 | 7.4 | 7.4 | 0 | 3.7 | 0 |

Although the oxygen content of the combustion exhaust stream 108 is increased to 3.2 vol %, the carbon dioxide content of the combustion exhaust stream, 108, was lower than in Example 2, at 17.4 vol %, and the carbon dioxide content of the treated flue gas, 109, was a little higher, at 3.1 vol %.

Example 4

Embodiment of the Invention with Split Ratio 1:2

In this set of calculations, the split ratio was changed to 1:2, that is, two volumes of exhaust gas were assumed to be sent to the membrane separation step for every volume of exhaust gas sent to the carbon dioxide capture step. The membrane area was again assumed to be 400 m$^2$, and the air flow rate in stream 101 was assumed to be the base calculation value of 950 kg/h. The results of the calculation are shown in Table 6.

TABLE 6

| Parameter/Stream | Coal (102) | Condenser Knockout (110) | Gas to Capture Step (107) | Membrane Feed (108) | Air Sweep (101) | Gas to Combustor (103) | Retentate (109) |
|---|---|---|---|---|---|---|---|
| Total Flow (kg/h) | 55 | 54 | 384 | 768 | 950 | 1151 | 567 |
| Temperature (° C.) | 25 | 40 | 40 | 40 | 25 | 35 | 25 |
| Pressure (bar) | 1.0 | 1.0 | 1.0 | 1.0 | 1.0 | 1.0 | 1.0 |
| Component (vol %) | | | | | | | |
| Coal (carbon + hydrogen) | 100.0 | 0 | 0 | 0 | 0 | 0 | 0 |
| Oxygen | 0 | 0 | 1.6 | 1.6 | 21.0 | 16.8 | 4.3 |
| Nitrogen | 0 | 0 | 69.7 | 69.7 | 79.0 | 67.8 | 89.2 |
| Carbon Dioxide | 0 | 0 | 21.3 | 21.3 | 0 | 10.6 | 6.4 |
| Water | 0 | 100 | 7.4 | 7.4 | 0 | 4.8 | 0.1 |

Increasing the relative volume of exhaust gas being treated in the membrane separation step results in a substantial increase in the concentration of carbon dioxide in the exhaust gas from the combustor. The exhaust gas has almost double the concentration of carbon dioxide compared with Example 1. Thus, use of the sweep-based membrane separation step in parallel with the carbon dioxide capture step could unload the carbon dioxide capture step proportionately; however, the oxygen content of the combustion exhaust stream, 108, has dropped to an undesirably low value (1.6 vol %) and the carbon dioxide content of the treated flue gas is relatively high (6.5 vol %).

Example 5

Embodiment of the Invention with Increased Membrane Area

To compensate for the adverse aspects of decreasing the split ratio as in Example 4, the membrane area was assumed to be doubled, to 800 m$^2$. As in Example 3, a set of calculations was performed, increasing the air intake incrementally to the process to bring the oxygen concentration of the flue gas stream from the combustor back to 3 vol % and the mass flow back to about 42 kg/h. This required the intake flow rate of air to be increased from 950 kg/h to 1,090 kg/h. All other operating parameters, including split ratio, were the same as in Example 4. The results of the calculation are shown in Table 7.

TABLE 7

| Parameter/Stream | Coal (102) | Condenser Knockout (110) | Gas to Capture Step (107) | Membrane Feed (108) | Air Sweep (101) | Gas to Combustor (103) | Retentate (109) |
|---|---|---|---|---|---|---|---|
| Total Flow (kg/h) | 55 | 51 | 456 | 912 | 1090 | 1364 | 638.1 |
| Temperature (° C.) | 25 | 40 | 40 | 40 | 25 | 35 | 25 |
| Pressure (bar) | 1.0 | 1.0 | 1.0 | 1.0 | 1.0 | 1.0 | 1.0 |
| Component (vol %) | | | | | | | |
| Coal (carbon + hydrogen) | 100 | 0 | 0 | 0 | 0 | 0 | 0 |
| Oxygen | 0 | 0 | 2.9 | 2.9 | 21.0 | 16.0 | 7.3 |
| Nitrogen | 0 | 0 | 67.8 | 67.8 | 79.0 | 66.5 | 89.6 |
| Carbon Dioxide | 0 | 0 | 21.8 | 21.8 | 0 | 12.7 | 3.1 |
| Water | 0 | 100 | 7.4 | 7.4 | 0 | 4.8 | 0 |

Compared to Example 4, the carbon dioxide content of the combustion exhaust stream, 108, remained high (21.8 vol %). The oxygen content of the combustion exhaust stream, 108, was raised to almost 3 vol %, and the carbon dioxide content of the treated flue gas, 109, was reduced to a much lower level of 3.1 vol %. The process achieves about 82% recovery of carbon dioxide.

Example 6

Embodiment of the Invention with Split Ratio 1:4

In this example, the split ratio was changed to 1:4; that is, four volumes of exhaust gas were assumed to be sent to the membrane separation step for every volume of exhaust gas sent to the carbon dioxide capture step. The membrane area was again assumed to be 400 m$^2$, and the air flow rate in stream 101 was assumed to be the base case calculation value of 950 kg/h. The results of the calculation are shown in Table 8.

TABLE 8

| Parameter/Stream | Coal (102) | Condenser Knockout (110) | Gas to Capture Step (107) | Membrane Feed (108) | Air Sweep (101) | Gas to Combustor (103) | Retentate (109) |
|---|---|---|---|---|---|---|---|
| Total Flow (kg/h) | 55 | 59 | 236 | 942 | 950 | 1182 | 710 |
| Temperature (° C.) | 25 | 40 | 40 | 40 | 25 | 37 | 25 |
| Pressure (bar) | 1.0 | 1.0 | 1.0 | 1.0 | 1.0 | 1.0 | 1.0 |
| Component (vol %) | | | | | | | |
| Coal (carbon + hydrogen) | 100 | 0 | 0 | 0 | 0 | 0 | 0 |
| Oxygen | 0 | 0 | 1.6 | 1.6 | 21.0 | 16.4 | 3.8 |
| Nitrogen | 0 | 0 | 68.5 | 68.5 | 79.0 | 66.3 | 86.8 |
| Carbon Dioxide | 0 | 0 | 22.5 | 22.5 | 0 | 11.8 | 9.1 |
| Water | 0 | 100 | 7.4 | 7.4 | 0 | 5.5 | 0.3 |

Increasing the relative volume of exhaust gas being treated in the membrane separation step results in a further increase in the carbon dioxide content of the combustion exhaust stream, 108, to 22.5 vol %; however, the oxygen content of the combustion exhaust stream, 108, is low (1.6 vol %) and the carbon dioxide content of the treated flue gas, 109, is high (9.1 vol %).

Example 7

Embodiment of the Invention

As with Example 5, the membrane area and air intake were assumed to be increased to balance the less desirable effects of decreasing the split ratio. In this example the membrane area was assumed to be increased to 1,600 m$^2$, and the air flow, 101, was assumed to be increased to 1,200 kg/h. Other parameters are as in Example 6, including a split ratio of 1:4. The results of the calculation are shown in Table 9.

TABLE 9

| Parameter/Stream | Coal (102) | Condenser Knockout (110) | Gas to Capture Step (107) | Membrane Feed (108) | Air Sweep (101) | Gas to Combustor (103) | Retentate (109) |
|---|---|---|---|---|---|---|---|
| Total Flow (kg/h) | 55 | 56 | 340 | 1361 | 1200 | 1702 | 859 |
| Temperature (° C.) | 25 | 40 | 40 | 40 | 25 | 37 | 25 |
| Pressure (bar) | 1.0 | 1.0 | 1.0 | 1.0 | 1.0 | 1.0 | 1.0 |
| Component (vol %) | | | | | | | |
| Coal (carbon + hydrogen) | 100 | 0 | 0 | 0 | 0 | 0 | 0 |
| Oxygen | 0 | 0 | 2.9 | 2.9 | 21.0 | 13.6 | 8.5 |
| Nitrogen | 0 | 0 | 62.0 | 62.0 | 79.0 | 60.8 | 88.1 |
| Carbon Dioxide | 0 | 0 | 27.7 | 27.7 | 0 | 19.9 | 3.3 |
| Water | 0 | 100 | 7.4 | 7.4 | 0 | 5.7 | 0.1 |

The combination of the lowered split ratio, increased membrane area, and increased air flow rate resulted in an increase of the carbon dioxide content of the combustion exhaust stream to 27.7 vol %. The oxygen content of the combustion exhaust stream, 108, was about 3 vol %, and the carbon dioxide content of the treated flue gas was lowered to 3.3 vol %. The process achieves about 75% carbon dioxide recovery.

Example 8

Embodiment of the invention with addition of oxygen

The process of the invention was assumed to be carried out as in Example 7. The only difference was that the air intake via the permeate sweep line was assumed to be at the base case flow rate value of 950 kg/h, and an additional 50 kg/h of pure oxygen was assumed to be introduced directly into the combustor as stream 115. The results of the calculation are shown in Table 10.

TABLE 10

| Parameter/Stream | Coal (102) | $O_2$ (101) | Condenser Knockout (110) | Gas to Capture Step (107) | Membrane Feed (108) | Air Sweep (101) | Gas to Combustor (103) | Retentate (109) |
|---|---|---|---|---|---|---|---|---|
| Total Flow (kg/h) | 55 | 50 | 58 | 306 | 1225 | 950 | 1485 | 690.4 |
| Temperature (° C.) | 25 | 25 | 40 | 40 | 40 | 25 | 37 | 25 |
| Pressure (bar) | 1.0 | 1.0 | 1.0 | 1.0 | 1.0 | 1.0 | 1.0 | 1.0 |
| Component (vol %) | | | | | | | | |
| Coal (carbon + hydrogen) | 100 | 0 | 0 | 0 | 0 | 0 | 0 | 0 |
| Oxygen | 0 | 100 | 0 | 3.0 | 3.0 | 21.0 | 12.4 | 9.7 |
| Nitrogen | 0 | 0 | 0 | 56.1 | 56.1 | 79.0 | 56.4 | 87.0 |
| Carbon Dioxide | 0 | 0 | 0 | 33.5 | 33.5 | 0 | 25.2 | 3.3 |
| Water | 0 | 0 | 100 | 7.4 | 7.4 | 0 | 6.0 | 0 |

With addition of make-up oxygen, the carbon dioxide content of the combustion exhaust stream, 108, is increased to 33.5 vol %. The oxygen content of the combustion exhaust stream, 108, is 3.0 vol %, and the carbon dioxide content of the treated flue gas, 109, is 3.3 vol %. The process achieves about 80% carbon dioxide recovery.

Examples 9 and 10

Embodiments of the Invention with Compressor in Membrane Feed Line

The calculations for Examples 9 and 10 were performed using the flow scheme shown in FIG. 2 and described in the Detailed Description, above. The flow scheme shown in FIG. 2 is a variant of the flow scheme shown in FIG. 1, in which the portion of the exhaust stream, 208, being routed to the sweep-based membrane separation step, 211, is passed through a compressor, 219, prior to being sent to the membrane separation step, 211.

Example 9

Embodiment of the Invention with Split Ratio 1:4

A calculation was performed using the results of Example 7 as basis, and again assuming a split ratio of 1:4. Iterative calculations showed that use of feed compression to 2 bar enables the membrane area to be reduced to 500 m$^2$, and the air flow, 201, to be reduced to 1050 kg/h. The results of the calculation are shown in Table 11.

TABLE 11

| Parameter/Stream | Coal (202) | Condenser Knockout (210) | Gas to Capture Step (207) | Membrane Feed (208) | Air Sweep (201) | Gas to Combustor (203) | Retentate (209) |
|---|---|---|---|---|---|---|---|
| Total Flow (kg/h) | 55 | 63 | 327 | 1309 | 1050 | 1644 | 715 |
| Temperature (° C.) | 25 | 30 | 30 | 45 | 25 | 40 | 25 |
| Pressure (bar) | 1.0 | 1.0 | 1.0 | 2.0 | 1.0 | 1.0 | 2.0 |

TABLE 11-continued

| Parameter/Stream | Coal (202) | Condenser Knockout (210) | Gas to Capture Step (207) | Membrane Feed (208) | Air Sweep (201) | Gas to Combustor (203) | Retentate (209) |
|---|---|---|---|---|---|---|---|
| Component (vol %) | | | | | | | |
| Coal (carbon + hydrogen) | 100 | 0 | 0 | 0 | 0 | 0 | 0 |
| Oxygen | 0 | 0 | 2.9 | 2.9 | 21.0 | 14.3 | 5.9 |
| Nitrogen | 0 | 0 | 607 | 60.7 | 79.0 | 58.9 | 91.2 |
| Carbon Dioxide | 0 | 0 | 32.1 | 32.1 | 0 | 23.5 | 2.9 |
| Water | 0 | 100 | 4.3 | 4.3 | 0 | 3.3 | 0 |

The carbon dioxide content of the combustion exhaust stream, 208, is 32.1 vol %. The oxygen content of the combustion exhaust stream, 208, is just under 3 vol %, and the carbon dioxide content of the treated flue gas, 209, is 2.9 vol %. Recovery of carbon dioxide is about 85%.

Example 10

Embodiment of the Invention with Split Ratio 1:9

This Example illustrates the combined effect of slight compression and a low split ratio of 1:9. The calculation was performed assuming a membrane area of 600 m², and an intake air flow rate in stream 201 of 1,150 kg/h. The assumption for membrane area and air intake flow rate are higher than for Example 9, to balance the lower split ratio. The results of the calculation are shown in Table 12.

TABLE 12

| Parameter/Stream | Coal (202) | Condenser Knockout (210) | Gas to Capture Step (207) | Membrane Feed (208) | Air Sweep (201) | Gas to Combustor (203) | Retentate (209) |
|---|---|---|---|---|---|---|---|
| Total Flow (kg/h) | 55 | 65 | 232 | 2085 | 1150 | 2327 | 909 |
| Temperature (° C.) | 25 | 30 | 30 | 45 | 25 | 43 | 25 |
| Pressure (bar) | 1.0 | 1.0 | 1.0 | 2.0 | 1.0 | 1.0 | 2.0 |
| Component (vol %) | | | | | | | |
| Coal (carbon + hydrogen) | 100 | 0 | 0 | 0 | 0 | 0 | 0 |
| Oxygen | 0 | 0 | 3.2 | 3.2 | 21.0 | 11.7 | 7.2 |
| Nitrogen | 0 | 0 | 50.1 | 50.1 | 79.0 | 48.9 | 89.3 |
| Carbon Dioxide | 0 | 0 | 42.4 | 42.4 | 0 | 35.7 | 3.5 |
| Water | 0 | 100 | 4.3 | 4.3 | 0 | 3.7 | 0 |

The carbon dioxide content of the combustion exhaust stream, 208, is increased to 42.4 vol %. The oxygen content of the combustion exhaust stream, 208, is 3.2 vol %, and the carbon dioxide content of the treated flue gas, 209, is 3.5 vol %. The recovery of carbon dioxide in this case drops to about 65%, but the very high carbon dioxide content in the feed stream to the carbon dioxide capture step provides a large benefit in terms of de-bottlenecking or reducing required capacity and operating costs for this step.

Examples 11 and 12

Embodiments of the Invention Using a Membrane Separation Unit as the Carbon Dioxide Capture Unit The calculations for Examples 11 and 12 were performed using the flow scheme shown in FIG. 3 and described in the Detailed Description, above. The flow scheme shown in FIG. 3 is a variant of the flow scheme shown in FIG. 1, in which the carbon dioxide capture step comprises two membrane-based capture steps, 326 and 328.

Example 11

Embodiment of the Invention with Compressor in Membrane Feed Line

This Example was calculated assuming approximately the same parameters as in Example 7; that is, a split ratio of 1:4, an air flow rate of 1,200 kg/h, and a membrane area for the sweep-based membrane step of 1,600 m². The membrane areas for the two membrane-based capture steps, 326 and 328, were assumed to be 22 m² and 20 m², respectively. The results of the calculation are shown in Table 13.

TABLE 13

| Parameter/Stream | Coal (302) | Condenser Overhead (308) | Feed to CO2 Capture (309) | CO2-vent (311) | CO2-rich (312) | CO2-lean (313) | Air Sweep (301) | Gas to Combustor (303) | Retentate (314) |
|---|---|---|---|---|---|---|---|---|---|
| Total Flow (kg/h) | 55 | 1364 | 334 | 134 | 35 | 165 | 1200 | 1712 | 886.3 |
| Temp. (° C.) | 25 | 30 | 40 | 39 | 37 | 37 | 25 | 29 | 25 |
| Pressure (bar) | 1.0 | 1.0 | 10.0 | 1.0 | 1.0 | 10.0 | 1.0 | 1.0 | 1.0 |
| Component (vol %) | | | | | | | | | |
| Coal (carbon + hydrogen) | 100 | 0 | 0 | 0 | 0 | 0 | 0 | 0 | 0 |
| Oxygen | 0 | 3.0 | 3.1 | 1.6 | 4.5 | 3.6 | 21.0 | 13.8 | 8.5 |
| Nitrogen | 0 | 63.1 | 65.4 | 18.8 | 59.2 | 93.4 | 79.0 | 61.3 | 87.7 |
| Carbon Dioxide | 0 | 30.0 | 30.8 | 77.3 | 36.0 | 3.0 | 0 | 21.6 | 3.8 |
| Water | 0 | 4.3 | 0.7 | 2.3 | 0.3 | 0.1 | 0 | 3.3 | 0 |

The feed gas, 309, to the two-step carbon dioxide capture process consists of 30.8 vol % carbon dioxide. The first carbon membrane capture step, 326, yields a concentrated carbon dioxide product, 311, containing 77.3 vol % carbon dioxide.

The feed stream, 310, from first membrane unit, 326, is routed to second membrane unit, 328, to recover more of the carbon dioxide from the stream. The permeate stream, 312, from the second membrane unit, 328, contains 36.0 vol % carbon dioxide, and is passed to the sweep-based membrane separation step, 330. The carbon-dioxide depleted feed stream, 313, from the second carbon dioxide capture step, 328, contains 3.0 vol % carbon dioxide. This stream is combined with the exhaust stream, 314, from the sweep-based membrane separation step, 330, which contains 3.8 vol % carbon dioxide, and is vented to the environment. Carbon dioxide is lost in both streams 313 and 314, so the recover of carbon dioxide is comparatively low, at about 65%.

Example 12

Embodiment of the Invention with Addition of Pure Oxygen

The calculations of Example 11 were repeated, but this time it was assumed that a make-up stream of 50 kg/h of pure oxygen was added directly to the combustor, as in Example 8, so that the air intake via the permeate sweep line was reduced to the base case flow rate value of 950 kg/h. As in Example 11, the split ratio was assumed to be 1:4, and the membrane area for the sweep-based membrane separation step was assumed to be 1600 m². The membrane areas for the two membrane-based capture steps, 326 and 328, were assumed to be 20 m² and 15 m², respectively. The results of the calculation are shown in Table 14.

TABLE 14

| Parameter/Stream | Coal (302) | O2 (301) | Condenser Overhead (308) | Feed to CO2 Capture (309) | CO2-vent (311) | CO2-rich (312) | CO2-lean (313) | Air Sweep (301) | Gas to Combustor (303) | Retentate (214) |
|---|---|---|---|---|---|---|---|---|---|---|
| Total Flow (kg/h) | 55 | 50 | 1227 | 301 | 143 | 28 | 130 | 950 | 1492 | 712 |
| Temp. (° C.) | 25 | 25 | 30 | 40 | 38 | 36 | 36 | 25 | 29 | 25 |
| Pressure (bar) | 1.0 | 1.0 | 1.0 | 10.0 | 1.0 | 1.0 | 10.0 | 1.0 | 1.0 | 1.0 |
| Component (vol %) | | | | | | | | | | |
| Coal (carbon + hydrogen) | 100 | 0 | 0 | 0 | 0 | 0 | 0 | 0 | 0 | 0 |
| Oxygen | 0 | 100 | 3.1 | 3.2 | 1.6 | 5.2 | 4.1 | 21.0 | 12.5 | 9.6 |
| Nitrogen | 0 | 0 | 57.1 | 59.2 | 15.7 | 58.7 | 92.9 | 79.0 | 57.1 | 86.5 |
| Carbon Dioxide | 0 | 0 | 35.5 | 36.8 | 80.8 | 36.0 | 3.0 | 0 | 27.0 | 3.9 |
| Water | 0 | 0 | 4.3 | 0.8 | 1.9 | 0.1 | 0 | 0 | 3.4 | 0 |

The feed gas, 309, to the two-step carbon dioxide capture process consists of 36.8 vol % carbon dioxide. The first carbon dioxide capture step, 326, yields a concentrated carbon dioxide product, 311, containing 80.8 vol % carbon dioxide. The feed stream, 310, from the first membrane unit, 326, is routed to second membrane unit, 328, to recover more of the carbon dioxide from the stream. The permeate stream, 312, from the second membrane unit, 328, contains 36.0 vol % carbon dioxide, which is then passed to the sweep-based membrane separation step, 330. The carbon-dioxide depleted feed stream, 313, from the second carbon dioxide capture step, 328, contains 3.0 vol % carbon dioxide. This stream is combined with the exhaust stream, 314, from the sweep-based membrane separation step, 330, and is routed to the environment with a carbon dioxide content of 3.9 vol %. The recovery of carbon dioxide is increased to 75% compared with 65% in Example 11.

These calculations show that a number of variants to the basic design of the process are possible. These changes to the process design and operating conditions will change the concentration of carbon dioxide in the stream sent to the carbon dioxide capture step and the overall recovery of carbon dioxide in the step. A trade-off exists between high carbon dioxide capture and high carbon dioxide concentration with the amount of membrane area in the sweep unit and other variable, such as the amount of compression used. The optimum conditions and design will depend on the goals of the plant operator and the cost of the membrane, compression, and so on.

We claim:

1. A combustion system adapted to control carbon dioxide emissions, comprising:
   (a) a combustion unit configured to combust a mixture of fuel and air, oxygen-enriched air, or oxygen, thereby producing an exhaust stream containing carbon dioxide;
   (b) a carbon dioxide capture unit configured to accept a first portion of the exhaust stream and remove a portion of carbon dioxide in concentrated form; and
   (c) a sweep-based membrane separation unit configured to accept a second portion of the exhaust stream, where the membrane separation unit comprises
      (i) at least one membrane having a feed side and a permeate side, where the at least one membrane is selectively permeable to carbon dioxide over nitrogen and to carbon dioxide over oxygen,
      (ii) means for passing the second portion across the feed side of the at least one membrane,
      (iii) means for passing air, oxygen-enriched air, or oxygen as a sweep stream across the permeate side of the at least one membrane,
      (iv) means for withdrawing from the feed side of the at least one membrane a carbon-dioxide depleted vent stream, and
      (v) means for withdrawing from the permeate side of the at least one membrane a permeate stream comprising oxygen and carbon dioxide, and to pass the permeate stream to the combustion unit as at least part of the air, oxygen-enriched air, or oxygen to the combustion unit.

2. The combustion system of claim 1, wherein the combustion unit is part of a power generation plant.

3. The combustion system of claim 1, wherein the combustion unit is an oven.

4. The combustion system of claim 1, wherein the combustion unit is a furnace.

5. The combustion system of claim 1, wherein the combustion unit is a boiler.

6. The combustion system of claim 1, wherein the fuel is selected from the group consisting of: a solid fuel, a liquid fuel, a gaseous fuel, and combinations thereof.

7. The combustion system of claim 1, wherein the carbon dioxide capture unit is an absorption unit.

8. The combustion system of claim 1, wherein the carbon dioxide capture unit is an adsorption unit.

9. The combustion system of claim 1, wherein the carbon dioxide capture unit is a liquefaction unit.

10. The combustion system of claim 1, wherein the carbon dioxide capture unit comprises at least one membrane separation unit.

11. The combustion system of claim 1, wherein the carbon dioxide capture unit comprises a combination of two or more units selected from the group consisting of: an absorption unit, an adsorption unit, a liquefaction unit, and a membrane separation unit.

12. The combustion system of claim 1, wherein a compressor is situated upstream of the sweep-based membrane separation unit.

13. The combustion system of claim 1, wherein the membrane unit comprises two or more membranes, and the two or more membranes are arranged in one or more modules, and wherein the one or more modules are arranged in a vertical configuration.

14. A power plant configured to control carbon dioxide exhaust from combustion processes performed therein, wherein the power plant comprises:
   (a) a combustion unit configured to combust a mixture of fuel and air, oxygen-enriched air, or oxygen, thereby producing an exhaust stream containing carbon dioxide;
   (b) a power generation system adapted to generate electricity by extracting energy from the exhaust stream;
   (c) a carbon dioxide capture unit configured to accept a first portion of the exhaust stream and remove a portion of carbon dioxide in concentrated form; and
   (d) a sweep-based membrane separation unit configured to accept a second portion of the exhaust stream, where the membrane separation unit comprises
      (i) at least one membrane having a feed side and a permeate side, where the at least one membrane is selectively permeable to carbon dioxide over nitrogen and to carbon dioxide over oxygen,
      (ii) means for passing the second portion across the feed side of the at least one membrane,
      (iii) means for passing air, oxygen-enriched air, or oxygen as a sweep stream across the permeate side of the at least one membrane,
      (iv) means for withdrawing from the feed side of the at least one membrane a carbon-dioxide depleted vent stream, and
      (v) means for withdrawing from the permeate side of the at least one membrane a permeate stream comprising oxygen and carbon dioxide, and to pass the permeate stream to the combustion unit as at least part of the air, oxygen-enriched air, or oxygen to the combustion unit.

15. The power plant of claim 14, wherein the fuel is selected from the group consisting of: a solid fuel, a liquid fuel, a gaseous fuel, and combinations thereof.

16. The power plant of claim 14, wherein the power generation unit is selected from the group consisting of a gas turbine unit and a steam turbine unit.

17. The power plant of claim 14, wherein the power plant is a combined cycle power plant comprising both a gas turbine unit and a steam turbine unit.

* * * * *